United States Patent
Tanihara et al.

(10) Patent No.: US 9,960,409 B2
(45) Date of Patent: May 1, 2018

(54) APPARATUS FOR MANUFACTURING ELECTRODE FOR LITHIUM ION SECONDARY BATTERY

(71) Applicant: TOYOTA JIDOSHA KABUSHIKI KAISHA, Toyota-shi, Aichi (JP)

(72) Inventors: Koichi Tanihara, Chiryu (JP); Yasuhiro Sakashita, Nissin (JP); Naohiro Hasama, Kamakura (JP); Yuto Hosono, Kawasaki (JP)

(73) Assignee: TOYOTA JIDOSHA KABUSHIKI KAISHA, Toyota-Shi, Aichi (JP)

( * ) Notice: Subject to any disclaimer, the term of this patent is extended or adjusted under 35 U.S.C. 154(b) by 41 days.

(21) Appl. No.: 14/972,472

(22) Filed: Dec. 17, 2015

(65) Prior Publication Data

US 2016/0181651 A1 Jun. 23, 2016

(30) Foreign Application Priority Data

Dec. 19, 2014 (JP) .................. 2014-257845

(51) Int. Cl.
*B05C 19/00* (2006.01)
*H01M 4/04* (2006.01)
*H01M 4/139* (2010.01)
*H01M 10/0525* (2010.01)

(52) U.S. Cl.
CPC ........... *H01M 4/0409* (2013.01); *B05C 19/00* (2013.01); *H01M 4/0435* (2013.01); *H01M 4/139* (2013.01); *H01M 10/0525* (2013.01)

(58) Field of Classification Search
USPC ........ 118/308, 248, 249, 258, 261, 262, 325
See application file for complete search history.

(56) References Cited

U.S. PATENT DOCUMENTS

| 3,667,422 A * | 6/1972 | Saladin .................. B05C 19/04 |
| | | 118/202 |
| 2010/0062146 A1 | 3/2010 | Hayashi et al. |
| 2014/0079872 A1 | 3/2014 | Uchida et al. |

FOREIGN PATENT DOCUMENTS

| CN | 101569033 A | 10/2009 |
| CN | 103825050 A | 5/2014 |
| JP | 9-180733 A | 7/1997 |

(Continued)

OTHER PUBLICATIONS

English Translation JP-2007052934A, Mar. 1, 2007.*
English Translation JP-09180733A, Jul. 1, 1997.*

*Primary Examiner* — Yewebdar T Tadesse
(74) *Attorney, Agent, or Firm* — Sughrue Mion, PLLC (57) ABSTRACT

Provided is an apparatus for manufacturing an electrode for a lithium ion secondary battery that makes it possible to form a more uniform active material layer by using granulated particles. The manufacturing apparatus includes: a conveying mechanism, a supply unit, a squeegee, an adjustment unit, and rolling rolls. The conveying mechanism conveys a collector. The supply unit supplies granulated particles, including active material particles and a binder, onto the surface of the conveyed collector. The squeegee levels the supplied granulated particles. The adjustment unit is disposed upstream of the squeegee. The adjustment unit controls the accumulation height of the granulated particles accumulated upstream of the squeegee. The rolling rolls roll the leveled granulated particles and form the active material layer.

6 Claims, 5 Drawing Sheets

(56) References Cited

FOREIGN PATENT DOCUMENTS

| | | | |
|---|---|---|---|
| JP | 2002-42789 A | 2/2002 | |
| JP | 2007052934 A * | 3/2007 | |
| JP | 2013-12327 A | 1/2013 | |
| JP | 2014-78497 A | 5/2014 | |
| JP | 2014-207179 A | 10/2014 | |
| JP | 2016-15244 A | 1/2016 | |
| WO | WO 2016006196 A1 * | 1/2016 | ......... H01M 4/0404 |
| WO | WO 2016038889 A1 * | 3/2016 | ......... H01M 4/0404 |

* cited by examiner

APPARATUS FOR MANUFACTURING ELECTRODE FOR LITHIUM ION SECONDARY BATTERY

CROSS-REFERENCE TO RELATED APPLICATIONS

The present application claims priority based on Japanese Patent Application No. 2014-257845 filed on Dec. 19, 2014 and the entire contents thereof is incorporated herein by reference.

BACKGROUND OF THE INVENTION

1. Field of the Invention

The present invention relates to an apparatus for manufacturing an electrode for a lithium ion secondary battery, and more particularly to an apparatus which manufactures an electrode for a lithium ion secondary battery by using granulated particles including an active material and a binder.

2. Description of the Related Art

An electrode for use in a lithium ion secondary battery is typically provided with an active material layer, which includes an active material, on a collector. The performance of the battery using this electrode can be stabilized by forming the active material layer homogeneous. The active material layer is typically formed by supplying a slurry-like electrode material, which is obtained by dispersing an active material in a liquid medium, onto a collector, drying same, and then consolidating the resultant. Moreover, an energy-saving, low-cost method for forming an active material layer is also known in which no liquid medium is used and the drying step is omitted. For example, Japanese Patent Application Publication No. 2014-078497 discloses a method for manufacturing an electrode by coating a liquid binder with a gravure roller on the surface of a collector, supplying granulated particles, which are obtained by granulating active material particles and a binder, on the coating with a powder feeder, and pressurizing with rolling rolls under heating.

SUMMARY OF THE INVENTION

Incidentally, the flowability of the granulated particles is inferior to that of slurry-like electrode material, and it is preferred that the granulated particles supplied on the collector be uniformly distributed prior to pressurization. For this purpose, a squeegee roll is disposed in front of the rolling rolls, and the granulated particles are uniformly distributed with the squeegee roll. However, since granulated particles have poor flowability, the amount of the granulated particles passing the squeegee roll may be uneven. Such unevenness in the amount of the granulated particles tends to be particularly prominent when a liquid binder is coated on the collector surface. As a result, the desired basis weight of the active material cannot be realized and the quality of the manufactured electrode can decrease.

The present invention has been created in view of the above-described problems inherent to the related art, and it is an objective of the present invention to provide an apparatus for manufacturing an electrode for a lithium ion secondary battery that can form a more uniform active material layer by using granulated particles.

In order to resolve the above-described problems, the technique disclosed herein provides an apparatus for manufacturing an electrode for a lithium ion secondary battery.

The manufacturing apparatus essentially includes: a conveying mechanism, a supply unit, a squeegee, an adjustment unit, and rolling rolls. The conveying mechanism conveys a collector. The supply unit supplies granulated particles including active material particles and a binder onto the surface of the conveyed collector. The squeegee levels the supplied granulated particles. The adjustment unit is disposed upstream of the squeegee. The adjustment unit controls the accumulation height of the granulated particles accumulated upstream of the squeegee. The rolling rolls roll the leveled granulated particles and form the active material layer.

Thus, due to the presence of the adjustment unit, it is possible to stabilize the accumulation state of the granulated particles which are accumulated upstream of the squeegee. Further, the uniformity in the amount of the granulated particles passing through the gap between the squeegee and collector can be improved. As a result, a high-quality electrode for a lithium ion secondary battery can be fabricated.

Further, the control accuracy of the amount of the granulated particles supplied from the supply unit can be relaxed. Therefore, even when the amount of the granulated particles supplied from the supply unit is uneven, a high-quality electrode for a lithium ion secondary battery can be fabricated.

In the preferred aspect of the manufacturing apparatus disclosed herein, the adjustment unit is provided with a horizontal surface facing the accumulated granulated particles. As a result, the accumulation state of the granulated particles accumulated upstream of the squeegee can be further stabilized.

In the preferred aspect of the manufacturing apparatus disclosed herein, the manufacturing apparatus further includes: a height sensor and a control unit. The height sensor is disposed upstream of the adjustment unit and measures the height of the supplied granulated particles. The control unit controls the supply amount of the granulated particles, which are supplied from the supply unit, on the basis of the measurement result of the height sensor. With such a configuration, even when the amount of the granulated particles supplied from the supply unit is uneven, the accumulation state of the granulated particles can be maintained more adequately.

In the preferred aspect of the manufacturing apparatus disclosed herein, the manufacturing apparatus further includes, upstream of the supply unit, a liquid binder supply unit that supplies a liquid binder including a binder onto the surface of the conveyed collector. With such a configuration, an electrode with an excellent binding strength of the granulated particles and collector can be manufactured.

In the preferred aspect of the manufacturing apparatus disclosed herein, the manufacturing apparatus further includes a guide unit. Further, the supply unit is provided with a discharge port for discharging the granulated particles, and a supply position is set in the vicinity of the collector surface which is the closest to a lower end of the squeegee, and upstream of the closest position. The guide unit is configured to extend from below the discharge port toward the supply position and supply the granulated particles discharged from the discharge port to the collector, in the vicinity of the supply position. The guide unit is preferably constituted by polytetrafluoroethylene.

With such a configuration, the supply state of the granulated particles can be further stabilized. Further, for example, even when a liquid binder is supplied to the collector surface, the occurrence of lumps of the granulated particles growing under the effect of the liquid binder can be suppressed and uniformity in granulated particles can be increased.

In the preferred aspect of the manufacturing apparatus disclosed herein, the squeegee is a squeegee roll of a cylindrical shape; and the adjustment unit is disposed at a height of $\frac{1}{12} \times r$ (inclusive) to $\frac{5}{12} \times r$ (inclusive) from a lower end portion of the squeegee roll, where r is a radius of the squeegee roll. The squeegee roll is generally rotated in reverse with respect to the conveying direction of the collector and can suppress the excess supply of the granulated particles. With the abovementioned configuration, the disturbance of the accumulation state of the granulated particles by the action of the squeegee roll can be advantageously suppressed.

In another aspect, the technique disclosed herein provides a method for manufacturing an electrode for a lithium ion battery. The manufacturing method includes the steps of: preparing granulated particles including physical particles and a binder, preparing a collector, supplying the granulated particles to the surface of the collector, accumulating the granulated particles supplied to the surface of the collector by adjusting the accumulation height thereof upstream of a squeegee, adjusting the supply amount of the granulated particles while leveling the accumulated granulated particles with a squeegee roll, forming an active material layer on the collector by rolling the leveled granulated particles.

With this manufacturing method, the granulated particles are stably accumulated upstream of the squeegee. As a result, the uniformity in the amount of granulated particles passing through the gap between the squeegee and collector is improved, a high-quality electrode with a uniform basis weight (a weight per area) can be manufactured. Further, the electrode can be manufactured with a good yield.

The preferred mode of the manufacturing method disclosed herein further includes a step for supplying a liquid binder including a binder to the surface of the conveyed collector prior to supplying the granulated particles. As a result, an electrode with a high bonding strength of the active material layer and collector can be manufactured.

DESCRIPTION OF THE PREFERRED EMBODIMENTS

An apparatus for manufacturing a lithium ion secondary battery, which is disclosed herein, will be described hereinbelow in greater detail on the basis the preferred embodiment thereof with reference to the appended drawings. Matters necessary to implement the invention other than those specifically referred to in this description (for example, general matters such as the configuration and operation method of a lithium ion secondary battery) can be understood by a person skilled in the art on the basis of the teaching of the present description and common technical knowledge in the pertinent field at the date of filing. Further, the drawings are drawn schematically, and the dimensional relationships (of length, width, thickness, etc.) in each drawing do not necessarily reflect actual dimensional relationships. Members and parts demonstrating the same effect are assigned with like reference numerals, and redundant explanation thereof is herein omitted or simplified.

The term "lithium ion secondary battery" in the present description refers to a repeatedly chargeable-dischargeable secondary battery which uses lithium ions as electrolyte (charge carrier) ions and in which charging and discharging are realized by the transfer of lithium ions (charges) between positive and negative electrodes. A battery (for example, a lithium ion polymer secondary battery) which is typically referred to as "lithium secondary battery" is included in the scope of lithium ion secondary batteries and represents a typical example of application for the electrode of the present description.

Figure 1:
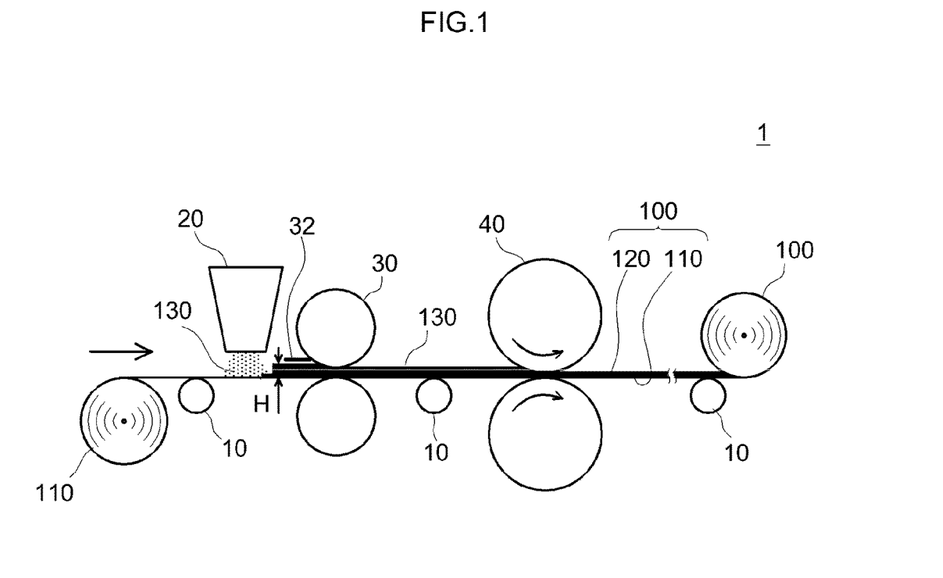
FIG. 1 is a general schematic diagram illustrating the configuration of the apparatus for manufacturing an electrode for a lithium ion secondary battery according to one embodiment.

FIG. 1 is a schematic drawing illustrating the apparatus for manufacturing a lithium ion secondary battery according to an embodiment. As depicted in FIG. 1, a manufacturing apparatus 1 disclosed herein is used for manufacturing an electrode 100 constituting a lithium ion secondary battery. The electrode 100 for a lithium ion secondary battery, which is the object of manufacturing, is typically provided with an active material layer 120 including an active material on one surface or both surfaces of a collector 110. The manufacturing apparatus 1 can be advantageously used when granulated particles 130 including active material particles 132 and a binder 134, rather than a slurry-like electrode constituting material, are used for configuring the active material layer 120. For example, the manufacturing apparatus can be used particularly advantageously when manufacturing the long electrode 100 in applications requiring a usage mode based a high capacity and/or high-rate charge and discharge. It goes without saying that the manufacturing apparatus can be used for manufacturing both the electrode (positive electrode) for a positive electrode and an electrode (negative electrode) for a negative electrode of a lithium ion secondary battery.

With the manufacturing apparatus 1, the electrode 100 is typically manufactured by forming the active material layer 120 on the collector 110 while conveying the long collector 110. The manufacturing apparatus 1 will be explained hereinbelow according to the preferred manufacturing sequence of the electrode for a lithium ion secondary battery.

Figure 2:
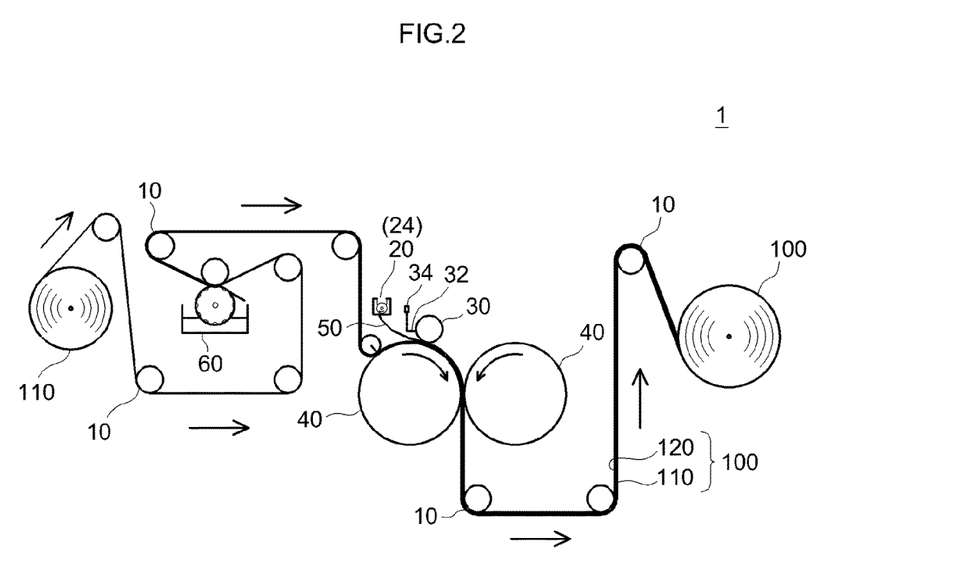
FIG. 2 is a general schematic diagram illustrating the configuration of the apparatus for manufacturing an electrode for a lithium ion secondary battery according to another embodiment.
Figure 3:
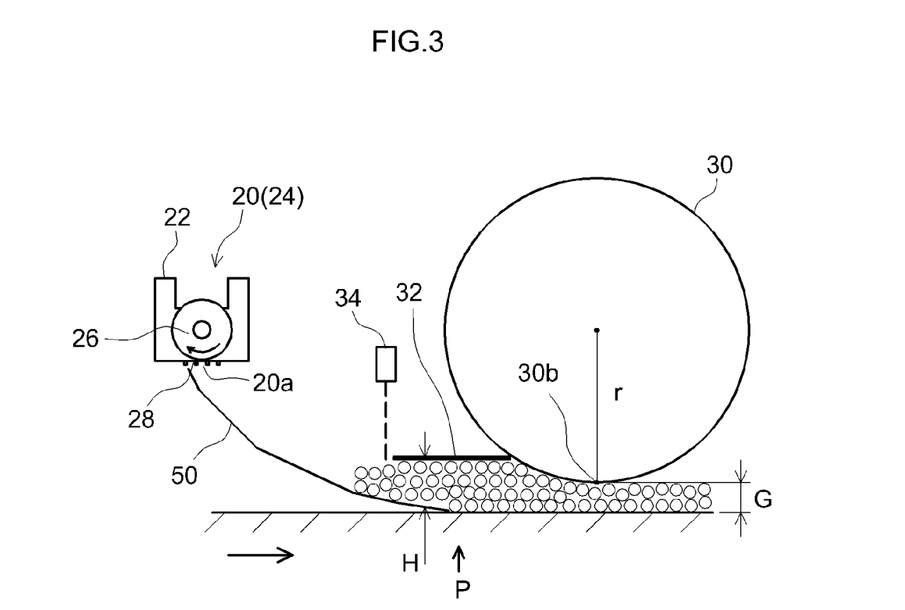
FIG. 3 is a principal schematic diagram illustrating the configuration of the supply unit and squeegee periphery depicted in FIG. 2.

The manufacturing apparatus 1 is basically configured of a conveying mechanism 10, a supply unit 20, a squeegee 30, an adjustment unit 32, and rolling rolls 40. As depicted in FIGS. 2 and 3, the manufacturing apparatus 1 can also include a control unit 24, a height sensor 34, a guide unit 50, and a liquid binder supply unit 60, although those constituent elements are optional.

Conveying Mechanism

The conveying mechanism (conveying unit) 10 can convey the collector 110 at a predetermined speed along a predetermined conveying path. A variety of well-known conveying means, such as a conveyor and guide reel, can be used as the conveying mechanism 10. For example, the conveying mechanism 10 can pull out the long collector 110 which has been wound into a roll, convey the collector along the predetermined conveying path, and then coil as the manufactured electrode 100. A collector constituted by a material that excels in electron conductivity and can be stably present inside a battery system can be advantageously used as the collector 110 with consideration for the active material and electrolytic solution which are to be used and an electrochemical reaction system associated therewith, although such collectors are not limiting. The collector material may be also determined with consideration for weight reduction, mechanical strength, and machinability. For example, when a positive electrode for a lithium ion secondary battery is manufactured, an aluminum foil (with a thickness, for example, of 12 μm to 15 μm) is preferred as the collector 110. Further, when a negative electrode for a lithium ion secondary battery is manufactured, a copper foil (with a thickness, for example, of 10 μm to 15 μm) is preferred as the collector 110. The shape of the collector 110 is not particularly limited since it can differ according to the shape of the lithium ion secondary battery. Thus, a variety of shapes, such as rods, plates, foils (sheets), and meshes, can be considered. For the electrodes of lithium ion secondary batteries of a high-capacity type, such as used on vehicles, an elongated sheet shape (stripe-shaped foil) is preferred.

Supply Unit

The supply unit 20 supplies the granulated particles 130 onto the surface of the collector 110 conveyed by the conveying mechanism 10. For example, a powder supply unit, which can be used for forming an electrode for a lithium ion secondary battery of this type, can be used, without any particular restriction, as the supply unit 20. For example, a variety of general-use supply units of a pressure supply system, rotary impeller system, rotary brush system, screw system, and rotary drum system, can be used without any particular limitation as the powder supply unit.

In the present embodiment, the supply unit 20 is constituted by a rotary-brush powder supply unit (see FIG. 3). The rotary-brush powder supply unit is typically provided with a hopper 22 and a brush rotor 26. The hopper 22 accommodates the granulated particles 130. The brush rotor 26 is a brush with bristles provided radially, with an axis of rotation serving as a center, and configured to be rotatable about the axis of rotation. The outer circumferential surface of the brush rotor 26 is closed with a circular-arc wall. The brush rotor 26 communicates with the space in the hopper 22 where the granulated particles 130 are accommodated, in one region (upper side in the figure) of the circular-arc wall, and is connected to a discharge port 20a in another region (lower side in the figure). Further, pick-up grooves for picking up the granulated particles 130 are provided in the brush rotor 26 by changing the length of a plurality of bristles thereon. As a result of the brush rotor 26 rotating inside the circular-arc wall, the granulated particles 130 located inside the hopper 22 are supplied successively in predetermined amounts into the pick-up grooves of the brush rotor 26. Further, following the rotation of the brush rotor 26, the granulated particles 130 which have been supplied into the pick-up grooves are conveyed along the circular-arc wall and discharged from the discharge port 20a. A mesh 28 typically can be provided in the discharge port 20a. Where the mesh 28 is provided in the discharge port 20a, the granulated particles 130 can be discharged more uniformly. The size of the discharge port 20a in the direction of axis of rotation of the brush rotor 26 can be adjusted. With such a configuration, the granulated particles 130 can be continuously supplied with a predetermined width onto the collector 110.

Granulated Particles

Figure 4:
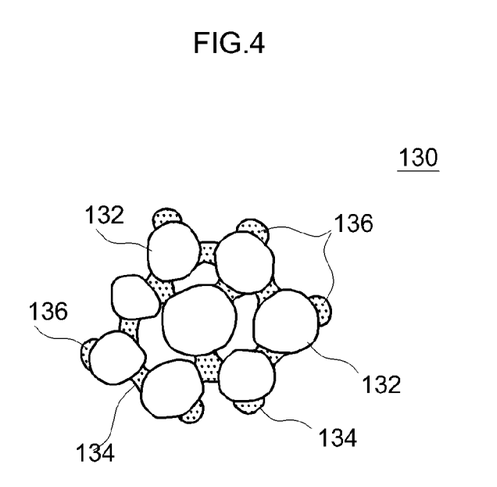
FIG. 4 is a schematic diagram illustrating a configuration example of a granulated particle.

In the technique disclosed herein, the granulated particles 130 include active material particles 132 of at least one type and a binder 134. The granulated particles 130 typically can be present in the form of a powder in which a plurality of particles is aggregated (granulated powder). The form of the granulated particles 130 is not particularly limited. For example, as depicted in FIG. 4, the granulated particle 130 typically includes a plurality of active material particles 132. In the granulated particles 130, the binder 134 is attached to the surface of individual active material particles 132, and the active material particles 132 can be bonded together by the binder 134. In the preferred form, the binder 134 is substantially uniformly dispersed and arranged, without local segregations inside the granulated particles 130 or on the outer surface thereof. The granulated particles 130 may include other materials (for example, an electrically conductive material 136) in addition to the active material particles 132 and the binder 134. When the electrically conductive material 136 is included, it is preferred that the electrically conductive material 136 be mainly dispersed in the binder 134.

Properties of the granulated particles 130 are not particularly limited. From the standpoint of increasing the production efficiency and forming a more uniform active material layer, for example, the particle size range of the granulated particles 130 may be about 10 μm (inclusive) to 200 μm (inclusive), more preferably 30 μm (inclusive) to 180 μm (inclusive), for example, 45 μm (inclusive) to 150 μm (inclusive). The average particle size is 20 μm (inclusive) to 100 μm (inclusive), preferably 30 μm (inclusive) to 90 μm (inclusive), for example, 50 μm (inclusive) to 80 μm (inclusive). The "particle size" and "average particle size", as referred to in the present description, are values measured with a particle size distribution measuring device based on a laser scattering and diffraction method. The "average particle size" is a particle size at an integral value of 50% in the particle size distribution based on the volume standard thereof, that is, the 50% volume-average particle size. The granulated particles 130 may be procured, for example, by preparing from starting materials or by purchasing the readymade products from material manufacturers, or the like.

A method for producing the granulated particles 130 is not particularly limited. For example, the granulated particles may be manufactured by dry or wet mixing of the active material particles 132 and the binder 134 at a predetermined ratio, granulating, and classifying. A method for granulating is also not particularly limited. Examples of suitable methods include rotary granulation, fluidized bed granulation, stirring granulation, compression granulation, extrusion granulation, pulverization granulation, and spray-dry granulation (spray granulation). In the preferred example, granulated particles 130 are granulated (molded) by mixing the active material particles 132 and the binder 134 in a solvent and drying by spraying the resultant mix (suspension) in a dry atmosphere. With this method the particles contained in a sprayed droplet are generally granulated as a single lump. Therefore, the size and mass of the granulated particle 130 can be easily adjusted by the size of the droplet. In addition to the active material particles 132 and the binder 134, the sprayed droplets can also include, for example, the electrically conductive material 136.

When the manufacture object is a positive electrode for a lithium ion secondary battery, various particulate materials which have been conventionally used as positive electrode active materials for lithium ion secondary batteries can be used, without any particular limitation, as the active material particles 132. The preferred examples of positive electrode active materials include particles of oxides including lithium and a transition metal element as constituent metal elements (lithium transition metal oxides), such as lithium nickel oxides (for example, $LiNiO_2$), lithium cobalt oxides (for example, $LiCoO_2$), lithium manganese oxides (for example, $LiMn_2O_4$), and composites thereof (for example, $LiNi_{0.5}Mn_{1.5}O_4$, $LiNi_{1/3}Co_{1/3}Mn_{1/3}O_2$), and particles of phosphates including lithium and a transition metal element as constituent metal elements, such as manganese lithium phosphate ($LiMnPO_4$) and iron lithium phosphate ($LiFePO_4$).

When the manufacturing object is a negative electrode for a lithium ion secondary battery, various particulate materials which have been conventionally used as negative electrode active materials for lithium ion secondary batteries can be used, without any particular limitation, as the active material particles 132. The preferred examples of negative electrode active materials include carbon-containing materials, such as artificial graphite, natural graphite, amorphous carbon, and composites thereof (for example, amorphous coated graphite), lithium transition metal oxides, and silicon compounds.

Materials suitable for granulation which are to be used may be selected from among a variety of materials, which are capable of bonding the active material, and used as the binder 134. For example, when a wet granulation method (for example, a spray-drying method) is used, a polymer material may be used that can be dissolved or dispersed in the solvent which is to be used. Specific examples include rubbers such as a styrene-butadiene copolymer (SBR) and an acrylic acid-modified SBR resin (SBR latex), cellulose polymers such as carboxymethyl cellulose (CMC), acrylic resins such as methacrylic acid ester copolymers, and vinyl halide resins such as polyvinylidene fluoride (PVdF).

In the configuration including the electrically conductive material 136, for example, a carbon material, constituted by comparatively fine particles of carbon black of active carbon can be advantageously used as the electrically conductive material 136. The electrically conductive material 136 is advantageously added when an active material with a poor electric conductivity is used, and is effective in terms of forming advantageous conductive paths in the active material layer or between the active material particles and collector. Aggregates of fine particles of carbon with an average primary particle diameter of 3 nm to 500 nm typically can be advantageously used as the electrically conductive material 136.

The compounding ratio of constituent components in the granulated particles 130 can be determined, for example, according to the application and desired characteristics of the lithium ion secondary battery. For example, for the granulated particles 130 to be used for manufacturing a lithium ion secondary battery for vehicle drive applications, the compounding ratio of the constituent components is preferably determined such as to enable the realization of the below-described configuration of the active material layer.

(Positive Electrode)

The positive electrode active material can be appropriately compounded such that the ratio thereof in the entire positive electrode active material layer is about 50 mass % or more, typically 70 mass % (inclusive) to 99 mass % (inclusive). Usually, the preferred range is 87 mass % (inclusive) to 95 mass % (inclusive). In the configuration including the electrically conductive material 136, the ratio thereof in the entire positive electrode active material layer can be, for example, about 1 mass % to 15 mass %, for example, 2 mass % (inclusive) to 10 mass % (inclusive). The preferred range is typically 3 mass % (inclusive) to 8 mass % (inclusive). The ratio of the binder 134, which is contained in the granulated particles, in the entire positive electrode active material can be, for example, about 0.5 mass % (inclusive) to 15 mass % (inclusive), for example, 1 mass % (inclusive) to 10 mass % (inclusive). The preferred range is typically 2 mass % (inclusive) to 5 mass % (inclusive). When a liquid binder is supplied in the manufacturing apparatus equipped with the below-described liquid binder supply unit, it is preferred that the sum total of the binder (second binder) contained in such a liquid binder and the binder contained in the granulated particles constitute the abovementioned binder ratio.

Negative Electrode

The negative electrode active material can be appropriately compounded such that the ratio thereof in the entire negative electrode active material layer is about 70 mass % or more, typically 90 mass % (inclusive) to 99 mass % (inclusive). Usually, the preferred range is 95 mass % (inclusive) to 99 mass % (inclusive). The ratio of the binder, which is contained in the granulated particles, in the entire negative electrode active material can be, for example, about 0.01 mass % (inclusive) to 10 mass % (inclusive), usually about 0.1 mass % (inclusive) to about 7 mass % (inclusive), and more preferably about 0.5 mass % (inclusive) to about 5 mass % (inclusive). When a liquid binder is supplied in the manufacturing apparatus equipped with the below-described liquid binder supply unit, it is preferred that the sum total of the binder (second binder) contained in such a liquid binder and the binder contained in the granulated particles constitute the abovementioned binder ratio.

Squeegee

The squeegee 30 is disposed upstream, in the conveying direction, of the supply unit 20 and above the conveyed collector 110, with a predetermined gap G therebetween. The squeegee serves to level the granulated particles 130 which are supplied on the collector 110. In this case, the gap G is determined such that the amount of the granulated particles 130 passing between a lower end portion 30b of the squeegee 30 and the collector 110 can ensure a predetermined basis weight. Although the gap G (gap in the vertical direction; in other words, the supply thickness of the granulated powder) between the squeegee S and the conveyed collector 110 is not particularly limited, for example, when a positive electrode is fabricated for a battery that can require a high energy density or a high output density, the gap is preferably adjusted to about 90 µm to 200 µm, for example, about 100 µm to 150 µm, and when a negative electrode for such a battery is fabricated, the gap is preferably adjusted to about 100 µm to 300 µm, for example, about 150 µm to 250 µm.

However, as mentioned hereinabove, the granulated particles 130 are obtained by mixing the active material particles 132 and the binder 134 and molding in a granular shape, and protrusions and depressions can appear on the outer surface. Typically, the binder 134 adheres to at least part of the outer surface of the granulated particles 130. Therefore, the flowability of the granulated particles 130 can be inferior to that of the usual active material powder (only the active material particles 132). Further, where any stress is applied, the binder 134 present on the outer surface of the granulated particles 130 can demonstrate tackiness. For this reason, under the conditions such that the usual active material powder flows without any problem, the granulated particles 130 can receive stresses in the flow direction and stick to each other or lumps can be formed. For example, the squeegee 30 generally scrapes off the excess granulated particles 130 and can partially inhibit the flow of the granulated particles 130. For this reason, the granulated particles 130 easily adhere to the squeegee 30 and lumps can be easily formed. Furthermore, the amount of the granulated particles 130 passing through the gap G between the squeegee 30 and the collector 110 can easily become uneven.

Figure 5:
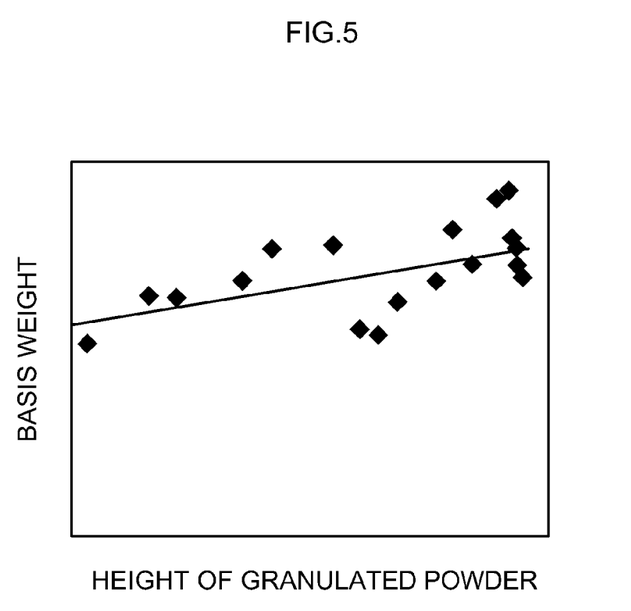
FIG. 5 illustrates the relationship between the height of the granulated particles accumulated upstream of a squeegee and the basis weight of the manufactured electrode in the conventional apparatus for manufacturing an electrode for a lithium ion secondary battery.

The detailed investigation conducted by the inventors has demonstrated that when the granulated particles 130 have accumulated upstream of the squeegee 30, a certain correlation can be found between the accumulated amount of the granulated particles and the basis weight of the manufactured electrode 100. For example, FIG. 5 shows the relationship between the bulkiness of the granulated particles 130 accumulated upstream of the squeegee 30 and the electrode basis weight. Data shown in FIG. 5 indicate that a generally proportional relationship can be found between the bulkiness of the granulated particles 130 and the electrode basis weight, although the picture is not clear since data relating to electrodes of different standards are included. Thus, as the bulkiness of the granulated particles 130 accumulated upstream of the squeegee 30 increases, the distance between a plurality of the granulated particles 130 decreases and the density of the granulated particles 130 positioned at lower levels rises. In other words, the density of the granulated particles 130 when they are supplied into the gap G increases. Therefore, even when the gap G is constant, the amount of the granulated particles 130 passing through the gap G may be uneven. Subsequent investigation conducted by the inventors has demonstrated, that by accumulating a predetermined amount of the granulated particles 130 upstream of the squeegee 30 and maintaining advantageously the accumulated amount, the state of the accumulated granulated particles 130 can be advantageously stabilized.

Adjustment Unit

Accordingly, in the apparatus 1 for manufacturing an electrode for a lithium ion secondary battery, which is disclosed herein, the adjustment unit 32 is provided upstream of the squeegee 30, and the accumulation height H (bulkiness) of the granulated particles 130 accumulated upstream of the squeegee 30 is adjusted by the adjustment unit 32. In other words, as a result of providing the adjustment unit 32, a predetermined space defined by the collector 110, the squeegee 30, and the adjustment unit 32 is formed upstream of the squeegee 30. The accumulation of the granulated particles 130 immediately before they are supplied into the gap G stabilizes the granulated particles 130. As a result, the density of the granulated particles 130 in the bottom portion which are accumulated upstream of the squeegee 30 and are supplied into the gap G can be maintained at a substantially constant level. The granulated particles 130 present in the bottom portion are compressed by the granulated particles 130 present thereabove and consolidated to a certain degree. Thus, the active material particles 132 in the granulated particles 130 are aggregated under a predetermined pressure and the density of the granulated particles 130 themselves can be also made more uniform. As a result, the amount of the granulated particles which are supplied into the gap can be made more uniform and unevenness in the basis weight can be suppressed. Further, since the granulated particles 130 are not present at a position higher than the accumulation height H, the application of unnecessary friction stresses to the accumulated granulated particles 130 (which are not supplied into the gap G can be suppressed).

Further, the accumulation height H of the granulated particles 130 is an index that can be used for determining the accumulated amount of the granulated particles 130 or uniformity thereof. Therefore, the accumulation height H does not necessarily accurately represent the height (absolute value) of the accumulated granulated particles 130. For example, the accumulation height H of the granulated particles 130 can be specified on the basis of a predetermined reference. More specifically, for example, the accumulation height H can be taken as a distance from the surface of the collector 110 to the topmost surface (upper surface) of the accumulated granulated particles 130. Further, for example, when the below-described guide unit 50 is used, the accumulation height can be taken as a distance from the surface of the guide unit 50 to the topmost surface (upper surface) of the accumulated granulated particles 130. Alternatively, for example, the accumulation height may be taken as a distance from the height of a predetermined region (for example, the lower end portion 30b) of the squeegee 30 to the topmost surface (upper surface) of the accumulated granulated particles 130.

The shape and material of the squeegee 30 are not particularly limited. For example, a rod, a plate, or a roll constituted by a metal material such as steel, a resin material such as a rubber or a polyurethane, or an inorganic material such as a ceramic can be used. In the technique disclosed herein, it is preferred that the squeegee 30 be a squeegee roller of a roll (cylindrical) shape. The roll-shaped squeegee 30 is preferred because the amount of the transferred granulated particles 130 is gradually reduced in the conveying direction, thereby making it possible to reduce stresses such as friction generated between the granulated particles 130 which are supplied into the gap G and the granulated particles 130 which are not supplied therein. Further, it is preferred that the squeegee roller be configured to be rotatable about a cylinder axis. For example, the rotation is preferred such that the lower end portion 30b of the squeegee roller rotates in reverse with respect to the conveying direction of the collector. In such a case, the granulated particles 130 are prevented from passing in an excess amount through the gap G. Furthermore, even where the granulated particles 130 stuck together, they can be separated from each other. The speed of such rotation is not particularly limited, but is preferably set such that the surface of the roll squeegee moves in reverse, for example, at a rate of about 0.1% to 10% (for example, 0.1% to 7%, more preferably 0.1% to 3%) with respect to the conveying speed of the collector.

The shape and material of the adjustment unit 32 are not particularly limited, provided that the accumulation height H (bulkiness) of the accumulated granulated particles 130 can be advantageously controlled. For example, the adjustment unit from various materials, such as metal materials, resin material, and inorganic materials, can be used. Further it is preferred that the adjustment unit 32 be configured such that the adjustment unit comes into intimate contact with the squeegee 30, the granulated particles 130 do not penetrate into a gap between the squeegee 30 and the adjustment unit 32, and the granulated particles 130 do not slip through the gap. From this standpoint, it is preferred that the region of the adjustment unit 32 that comes into contact with the squeegee 30 be from a rubber or resin material having elasticity or flexibility corresponding thereto (for example, a polyethylene resin, an epoxy resin, and composite resins obtained by a adding a reinforcing agent such as carbon fibers and glass fibers thereto).

Further, it is preferred that the surface where the adjustment unit 32 is in contact with the accumulated granulated particles 130 (lower surface in FIG. 3) be substantially horizontal. Thus, it is preferred that the adjustment unit 32 be provided with a horizontal surface facing the accumulated granulated particles. For example, the adjustment unit can be constituted of a plate-like body. It is undesirable that the adjustment unit 32 be inclined upward in the conveying direction, because in such a case the granulated particles 130 easily penetrate between the adjustment unit 32 and the squeegee 30 and the granulated particles 130 can easily slip between the adjustment unit 32 and the squeegee 30. It is also undesirable that the adjustment unit 32 be inclined downward in the conveying direction, because in such a case, an excess compressive stress is applied to the granulated particles 130 that are successively supplied from the supply unit 20 and supplied into the gap G, thereby causing the granulated particles 130 to demonstrate viscous properties.

Further, for example, when the squeegee 30 is a squeegee roller, the abovementioned accumulation space narrows in the conveying direction due to the roller shape. Therefore, the squeegee roller is rotated (reversed) such that the lower end portion 30b thereof moves in the direction opposite to the particle advance direction, as depicted in FIG. 3, so that the granulated particles 130 are prevented from being supplied in an excess amount into the gap G. In this case, it is undesirable that the accumulation height H be too large because in such a case a force by which the granulated particles 130 are pushed upward by the rotation of the squeegee roller increases and the stability of the granulated particles 130 inside the accumulation space can be disturbed. Therefore, it is preferred that the adjustment unit 32 be disposed at a height of $1/12 \times r$ (inclusive) to $5/12 \times r$ (inclusive), preferably, $1/8 \times r$ (inclusive) to $3/8 \times r$ (inclusive), for example, $1/6 \times r$ (inclusive) to $1/3 \times r$ (inclusive) from the lower end portion 30b of the squeegee roller, where r is the radius of the squeegee roller.

The size of the adjustment unit 32 in the conveying direction is not particularly limited, but is preferably about the same as the abovementioned accumulation height H. For example, the size of about ±30% (more preferably about ±15%) of the accumulation height H is preferred. In a specific example, when the accumulation height H is 15 mm, the size of the adjustment unit 32 in the conveying direction is preferably about 10.5 mm to 19.5 mm. In such a case, it is possible to ensure a sufficient accumulation space which is not excessive.

Where the adjustment unit 32 is provided and a predetermined amount of the granulated particles 130 is accumulated upstream of the squeegee 30, a constant amount of the granulated particles 130 can be supplied on the collector by driving the conveying mechanism 10 (and the squeegee roller). Therefore, the supply amount of the granulated particles 130 in the supply unit 20 cannot produce a direct effect on the basis weight of the granulated particles 130 within a range in which the accumulation amount of the granulated particles 130 is ensured. As a consequence, even when a problem such as clogging caused by the granulated particles 130 occurs in the supply unit 20, this can be dealt with easier than in the conventional configurations. Further, the accuracy of the supply amount of the granulated particles 130 in the supply unit 20 can be controlled under more relaxed conditions with reference, for example, to the accumulation height H, rather than the basis weight.

Height Sensor, Control Unit

The apparatus 1 for manufacturing an electrode for a lithium ion secondary battery, which is disclosed herein, preferably further includes the height sensor 34 and the control unit 24. The height sensor 34 is typically provided upstream of the adjustment unit 32. The height sensor 34 measures the height (for example, the accumulation height H) of the supplied granulated particles 130. Typically, a device that can measure a height by a contactless method, e.g., by using a laser, can be advantageously used as the height sensor 34. The control unit 24 controls the operation of the supply unit 20. The control unit 24 is provided, for example, at the supply unit 20. The control unit 24 has a function of controlling the supply unit 20 such that the supply amount of the granulated particles is adjusted. For example, the control unit 24 controls the supply amount of the granulated particles 130 from the supply unit 20 on the basis of the measurement result of the height sensor 34 so as to realize and maintain advantageously the predetermined accumulation height H. For example, when the height sensor 34 determines that the height of the granulated particles 130 upstream of the adjustment unit 32 is greater than a predetermined reference value and the supply amount of the granulated particles 130 is excessive, the control unit 24 controls the supply unit 20 such as to reduce the supply amount of the granulated particles 130. For example, the control unit 24 can reduce the revolution speed of the brush rotor 26 to reduce the supply amount of the granulated particles 130 from the supply unit 20. Further, for example, when the height sensor 34 determines that the height of the granulated particles 130 upstream of the adjustment unit 32 is lower than the reference value and the supply amount of the granulated particles 130 is insufficient, the control unit 24 controls the supply unit 20 such as to increase the supply amount of the granulated particles 130. For example, the control unit 24 can increase the revolution speed of the brush rotor 26 to increase the supply amount of the granulated particles 130 from the supply unit 20. In this case, the reference value can be relaxed by about 100% to 200% with respect to the basis weight accuracy. As a result, a highly accurate basis weight can be realized while relaxing the control of the supply amount of the granulated particles 130.

The feature of controlling the basis weight of the active material by providing a height sensor is also well known in the conventional apparatus 1 for manufacturing an electrode for a lithium ion secondary battery using the conventional granulated particles. However, for example, where a contactless height sensor, such as a laser, is used to measure the supply amount of the granulated particles 130 which are coarser than the active material particles and can include voids inside thereof, the basis weight control accuracy tends to decrease with respect to that in the case where the active material particles are used. By contrast, in the electrode manufacturing apparatus 1 disclosed herein, the basis weight of the active material can be advantageously adjusted by the control unit 24. Further, the height sensor 34 can also control the amount of the granulated particles 130 accumulated upstream of the squeegee 30.

Rolling Rolls

The rolling rolls 40 are used to roll the granulated particles 130 leveled with the squeegee 30 in the above-described manner and form the active material layer 120 on the surface of the collector 110. As depicted in FIGS. 1 to 3, in the present embodiment, the collector 110 on which the squeegeed granulated particles 130 are located is guided toward a space between a pair of rolling rolls 40 disposed in balance at a predetermined distance from each other. The rolling rolls 40 are rotated at a constant speed in the mutually opposite directions, and the granulated particles 130 passing through the space between the rolling rolls 40 are pressed with an appropriate strength against the collector 110 and fixedly attached to the collector 110. At the same time, the number of contact locations of the binder 134 inside the granulated particles 130 is increased and the active material particles 132 are strongly bonded to each other. The adjacent granulated particles 130 are also strongly bonded to each other. As a result, the layer (active material layer 120) of the granulated particles 130 including the active material particles 132 is molded to a substantially constant thickness on the surface of the collector 110. As a result, the electrode 100 for a lithium ion secondary battery is manufactured.

As for the material of the rolling rolls 40, the rolling surface thereof can be from a rubber material, metal material, or inorganic material. The distance (gap in the vertical direction) between the rolling rolls 40 may be adjusted, for example, such that the formed active material layer 120 have the desired properties (for example, thickness or porosity).

A molding enhancing means, such as appropriate heating, can be also used during rolling. By performing rolling in a heated state, it is possible to soften or melt advantageously the binder contained in the granulated powder and to bond the granulated particles 130 together more strongly.

For example, for the electrode to be used in a battery of a comparatively high capacity type with a battery capacity of 20 Ah or more, the process can be implemented by referring to the following conditions.

(Positive Electrode)

Distance between rolling rolls 40: the same as the thickness of the positive electrode (for example, 30 µm to 120 µm).

Roll linear pressure: 1 t/cm to 2 t/cm.

Rolling temperature: 25° C. (for example, heating may be conducted to about 60° C. to 180° C.).

Positive electrode active material layer density: 1.5 g/cm$^3$ (inclusive) (2 g/cm$^3$ or more) to 4.5 g/cm$^3$ (inclusive) (typically, 4.0 g/cm$^3$ or less).

(Negative Electrode)

Distance between rolling rolls 40: the same as the thickness of the negative electrode (for example, 20 µm to 130 µm).

Roll linear pressure: 1 t/cm to 2 t/cm.

Rolling temperature: 25° C. (for example, heating may be conducted to about 60° C. to 180° C.).

Negative electrode active material layer density: 1.0 g/cm$^3$ (inclusive) (2 g/cm$^3$ or more) to 3.5 g/cm$^3$ (inclusive) (typically, 3.0 g/cm$^3$ or less).

In the embodiment illustrated by FIG. 1, a pair of the rolling rolls 40 is arranged in the electrode manufacturing apparatus 1, and a one-stand rolling method is used in which the roll rolling is performed only once. However, the electrode manufacturing apparatus 1 is not limited to such an embodiment. For example, two or more pairs of the rolling rolls 40 (typically two pairs) can be also provided and a multistage rolling method can be used in which the roll rolling is performed two or more times (typically, two times). Further, depending on the arrangement of the conveying path of the collector 110, an auxiliary roll may be provided upstream of the rolling rolls 40 (such a configuration is not specifically depicted in the figures). For example, in the embodiment illustrated by FIG. 2, the collector 110 is conveyed vertically downward between the pair of rolling rolls 40. In this case, the electrode manufacturing apparatus 1 may be provided with an auxiliary roll between the squeegee 30 and the rolling rolls 40, and rolling processing may be lightly performed before formal rolling. As a result, the granulated particles 130 which have passed by the squeegee 30 can be prevented from sliding off from the collector 110 before being supplied to the rolling rolls 40.

In the preferred embodiment, the active material layer 120 is formed by supplying the granulated particles 130 only to a partial region of the surface of the collector 110 with the supply unit 20. For example, when a stripe-shaped electrode 100 is fabricated, the active material layer 120 may be formed to have a width less than the total width of the collector 110 in the lateral direction perpendicular to the longitudinal direction. In other words, it is preferred that a region where the active material layer 120 is not formed (collector exposed portion) be provided at one or both ends, for example, along the end in the lateral direction in a partial region of the collector 110. For example, the collector exposed portions may be provided along both ends in the lateral direction of the stripe-shaped collector 110, and the active material layer 120 may be provided in a region (region close to the center in the lateral direction) between the collector exposed portions. In this case, two electrodes for a lithium ion secondary battery can be manufactured at once by cutting (half-cutting) the electrode 100 at a half width in the center in the lateral direction. Further, for example, when a single stripe-shaped electrode is manufactured without half-cutting, it is preferred that the collector exposed portion be provided at one end in the lateral direction of the collector 110. Such a collector exposed portion can be used as the so-called collector portion when the battery is constructed. For example, when the collector exposed portion is provided at both ends in the lateral direction of the collector 110, the width of the collector exposed portion (collector portion) can be about 13.5±1 mm in the case of a positive electrode and about 11±1 mm in the case of a negative electrode, those numbers being merely rough indicators because specific values depend on the total width of the collector 110. Therefore, the electrode manufacturing apparatus 1 disclosed herein may be provided with a cutting unit for cutting the electrode downstream of the rolling rolls 40.

Further, the apparatus 1 for manufacturing an electrode for a lithium ion secondary battery can be also provided with a liquid binder supply unit 60, for example, such as depicted in FIG. 2, although this unit is optional. In such a manufacturing apparatus, the liquid binder supply unit 60 is typically arranged upstream of the abovementioned supply unit 20. A binder solution is accommodated in the liquid binder supply unit 60, and the unit is configured such that the liquid binder is continuously supplied in a predetermined amount onto the collector 110 to obtain predetermined width and pattern as the collector 110 is conveyed with the conveying mechanism 10. As a result, a liquid binder layer (not depicted in the figure) is formed on the collector 110. Where the collector 110 provided with the liquid binder layer is conveyed to the supply unit 20, the active material layer 120 is thereafter formed by supplying the granulated particles 130 onto the collector 110 provided with the liquid binder layer. As a result, the collector 110 and the active material layer 120 which is formed thereafter can be bonded together more strongly, the active material layer 120 is prevented from peeling and the granulated particles 130 are prevented from slipping down, and durability in a long-term use can be increased.

The liquid binder supply unit 60 is not particularly limited. For example, a coating device such as a gravure coater, slit coater, die coater, comma coater, and dip coater can be used. A binder solution can be supplied by continuous coating or in a predetermined pattern (for example, vertical or inclined stripes, wavy lines, and dots) on the collector.

The binder solution which is supplied to the liquid binder supply unit 60 is obtained by dispersing or dissolving a binder (second binder) in a solvent. An aqueous or nonaqueous (for example, organic) solvent can be used, as appropriate. From the standpoint of reducing the environmental load and ensuring safety and sanitary level, water or a mixed solvent based on water and also including a lower alcohol can be advantageously used. Further, for example, N-methyl-2-pyrrolidone (NMP) can be used as the organic solvent. A polymer material dissolvable or dispersible in the solvent used may be used as the binder (second binder) of the binder solution. This binder (second binder) may be, for example, the same as or different from that used in the preparation of granulated powder. For example, when an aqueous solvent is used, the abovementioned rubber, cellulose polymer, or acrylic resin can be advantageously used. When an organic solvent is used, for example, the aforementioned vinyl halide resin can be advantageously used. For example, when a positive electrode for a lithium ion secondary battery is manufactured, an acrylic resin may be admixed as the second binder to water as a solvent. Further, for example, when a negative electrode for a lithium ion secondary battery is manufactured, a rubber may be admixed as the second binder to water as a solvent.

Properties, such as concentration or thickness, of the liquid binder layer formed by the liquid binder supply unit 60 are not particularly limited and can be adjusted, as appropriate, so as to form the active material layer 120 in the desired state. For example, as a rough indication, the thickness of the liquid binder layer may be, for example, 1 µm or more, preferably 2 µm or more, in order to improve adhesion between the collector 110 and the active material layer 120. Further, from the standpoint of reducing the electric resistance, for example, the thickness may be 25 µm or less, preferably 10 µm or less.

In the preferred embodiment, the liquid binder layer is formed by supplying a binder solution only onto partial region of the surface of the collector 110. For example, when a stripe-shaped electrode is fabricated, the liquid binder layer may be formed in a region with a width less than the entire width of the collector 110 in the width direction perpendicular to the longitudinal direction, similarly to the above-described formation of the active material layer 120. In other words, it is preferred that the exposed portion of the collector 110 where the liquid binder layer is not formed be provided at the lateral ends of the collector 110.

The apparatus 1 for manufacturing an electrode for a lithium ion secondary battery can be further provided with a guide unit 50, such as depicted in FIGS. 2 and 3, but this component is optional. Thus, it is preferred that the electrode manufacturing apparatus 1 equipped with the liquid binder supply unit 60 be provided with the guide unit 50. This is because, where the granulated particles 130 are supplied to the collector 110 provided with the liquid binder layer, the liquid binder starts adhering around the as-supplied granulated particles 130, or the absorption of the liquid binder into the granulated particles 130 is started immediately after the supply. Where such granulated particles 130 are conveyed to the squeegee 30, the granulated particles 130 to which the liquid binder has adhered can accumulate to a large height upstream of the squeegee 30. The flowability of the granulated particles 130 to which the liquid binder has adhered is further decreased, lumps can be formed, or the gap G in the squeegee 30 can be clogged.

By contrast, the guide unit 50 guides the granulated particles 130, which have been discharged from the discharge port 20a of the supply unit 20, to the supply position P of the granulated particles 130 close to the gap G between the collector 110 and the lower end portion 30b of the squeegee 30 and then supplies the granulated particles onto the collector 110. After discharged from the discharge port 20a, the granulated particles 130 may slip on the guide unit 50, and be supplied on collector 110 at the supply position P of the granulated particles 130 close to the gap G. The material of the guide unit 50 is not particularly limited. The guide unit 50 is preferably constituted by fluorine resin, such as polytetrafluoroethylene, to which the liquid binder is hard to adhere. For example a thing which consists of the fluorine system resin by which binder liquid is the poly tetrafluoro ethylene for which it's difficult to be adherent pleases in guide part 50. Therefore, squeegeeing can be implemented while preventing the liquid binder from adhering to or from being absorbed by the granulated particles 130. In this case, the supply position P of the granulated particles 130 is in the vicinity of the surface of the collector 110 which is the closest to the lower end portion 30b of the squeegee 30 (in other words, which is directly below the lower end portion 30b), and can be set upstream of this closest position. That is, the supply position P is set in the vicinity of a position where the collector surface comes closest to a lower end of the squeegee, and upstream of the closest position. Further, as depicted in FIG. 3, the supply position is preferably located downstream of the upstreammost position of the adjustment unit 32 (that is, the end portion on the side opposite that of the end portion that is in contact with the squeegee 30). Thus, it is preferred that the downstreammost side of the guide unit 50 configure (delineate) part of the accumulation space of the granulated particles 130. Even when the guide unit 50 is provided, the accumulation height H and the height of the granulated particles 130 can be measured and determined in the same manner as described hereinabove.

The electrode manufacturing apparatus 1 disclosed herein is provided with the adjustment unit 32, and the state of the granulated particles 130 in the accumulation space is stabilized. Therefore, even when the granulated particles 130 are supplied on the liquid binder layer, the granulated particles 130 accumulated upstream of the squeegee 30 are less likely to form lumps than when the adjustment unit 32 is not present. Thus, for example, stirring of the granulated particles 130 in the accumulation space in the vertical direction is suppressed. As a result, the supply position P can be set farther to the upstream side from the position directly below the lower end portion 30b of the squeegee 30 than when the adjustment unit 32 is not present. For example, when the adjustment unit 32 is not present, a supply position P' is set 20 mm to 50 mm upstream from the position directly below the lower end portion 30b of the squeegee 30, but by providing the adjustment unit 32, it is possible to set the supply position P at 100 mm or father upstream from the position directly below the lower end portion 30b of the squeegee 30. Such a configuration is preferred because even when the guide unit 50 is shifted for whatever reason and the supply position P is changed, the electrode 100 can be manufactured without decreasing the quality.

With the apparatus 1 for manufacturing an electrode for a lithium ion secondary battery, functions of the adjustment unit 32 make it possible to improve the uniformity in basis weight. For example, when an electrode manufacturing apparatus is used that includes no adjustment unit 32, the accuracy of the thickness of the active material layer 120 after squeegeeing is about the designed thickness ±5%. By contrast, with the electrode manufacturing apparatus 1 disclosed herein, an electrode with an accuracy of the designed thickness ±3%, more preferably ±2% can be manufactured.

Such an electrode manufacturing apparatus 1 can be advantageously used for manufacturing electrodes for lithium ion secondary batteries of a high-capacity type which are charged and discharged at a high rate, such as used as a power source for driving a vehicle. Thus, in the batteries of a high-capacity type, the thickness of the active material layer 120 is comparatively large and the effect produced by uneven basis weight on electrode characteristics can be more significant. Furthermore, the uneven basis weight can reduce quality, such as electrode performance and safety. Therefore, the present invention can be used particularly advantageously for manufacturing electrodes for such lithium ion secondary batteries for vehicles.

[Application of Electrode for Lithium Ion Secondary Battery]

With the manufacturing method suggested herein, it is possible to supply the granulated powder evenly on the collector and to manufacture an electrode provided with an active material layer of a high basis weight. Therefore, a high-quality electrode for a lithium ion secondary battery demonstrating power generation performance at a high level with good stability can be obtained. A battery equipped with such an electrode can be particularly advantageously used as a power source for drive sources, for example, such as motors for driving vehicles. The type of the vehicles is not particularly limited, and examples thereof include, plug-in hybrid vehicles (PHV), hybrid vehicles (HV), electric vehicles (EV), electric trucks, electric scooters, power-assisted bicycles, electric wheelchairs, and electric trains. Such lithium ion secondary batteries may be formed as battery packs in which a plurality of the batteries is connected in series and/or parallel.

Specific examples of the present invention are described in detail hereinabove, but those examples place no limitation on the claims. The scope of the claims is inclusive of various changes and modifications of the specific examples described hereinabove.

What is claimed is:

1. An apparatus for manufacturing an electrode for a lithium ion secondary battery, comprising:
   a conveying mechanism for conveying a collector in a transport direction;
   a supply unit for supplying granulated particles in the state of powder onto a surface of the conveyed collector, the granulated particles including active material particles and a binder;
   a squeegee for leveling the supplied granulated particles;
   an adjustment unit provided with a horizontal lower surface at a position spaced above the conveyed collector and disposed upstream of the squeegee in the transport direction and arranged side by side to the squeegee, the adjustment unit facing the granulated particles accumulated upstream of the squeegee and controlling an accumulation height of the accumulated particles; and
   rolling rolls for rolling the leveled granulated particles and forming an active material layer,
   wherein the accumulation height of the accumulated particles is taken as a distance from the surface of the conveyed collector to the upper surface of the accumulated granulated particles.

2. The apparatus according to claim 1, further comprising:
   a height sensor disposed upstream of the adjustment unit and for measuring a height of the supplied granulated particles; and
   a control unit for controlling a supply amount of the granulated particles supplied from the supply unit, on the basis of a measurement result of the height sensor.

3. The apparatus according to claim 1, further comprising, upstream of the supply unit:
   a liquid binder supply unit that supplies a liquid binder including a binder onto the surface of the conveyed collector.

4. The apparatus according to claim 1, further comprising a guide unit, wherein:
   the supply unit is provided with a discharge port for discharging the granulated particles;
   a supply position is set in the vicinity of the collector surface which is the closest to a lower end of the squeegee, and upstream of the closest position; and
   the guide unit extends from below the discharge port toward the supply position and supplies the granulated particles discharged from the discharge port to the collector, in the vicinity of the supply position.

5. The apparatus according to claim 1, wherein
   the squeegee is a squeegee roll of a cylindrical shape; and
   the adjustment unit is disposed at a height of $^1/_{12} \times r$ (inclusive) to $^5/_{12} \times r$ (inclusive) from a lower end portion of the squeegee roll, where r is a radius of the squeegee roll.

6. The apparatus according to claim 4, wherein
   the guide unit is constituted by polytetrafluoroethylene.

* * * * *